United States Patent [19]
Baba et al.

[11] 4,163,483
[45] Aug. 7, 1979

[54] AUTOMATIC CLEARANCE ADJUSTING MECHANISM IN A BRAKE

[75] Inventors: Takashi Baba, Toyota; Hiroshi Kawaguchi; Kohji Nishikawa, both of Susono, all of Japan

[73] Assignee: Toyota Jidosha Kogyo Kabushiki Kaisha, Aichi, Japan

[21] Appl. No.: 895,649

[22] Filed: Apr. 12, 1978

Related U.S. Application Data

[63] Continuation of Ser. No. 772,097, Feb. 25, 1977, abandoned.

[30] Foreign Application Priority Data

Mar. 1, 1976 [JP] Japan .................. 51-021898

[51] Int. Cl.$^2$ ............................................. F16D 65/54
[52] U.S. Cl. ........................... 188/71.8; 188/196 P
[58] Field of Search ............... 188/71.8, 72.4, 196 P; 192/111 A

[56] References Cited

U.S. PATENT DOCUMENTS

| | | | |
|---|---|---|---|
| 2,746,254 | 5/1956 | Lucien | 188/196 P |
| 3,113,646 | 12/1963 | Airheart et al. | 188/71.8 |
| 3,115,220 | 12/1963 | Cagle | 188/196 P |
| 3,186,521 | 6/1965 | Chowings | 188/71.8 |
| 3,312,317 | 4/1967 | Hawley et al. | 188/196 P |
| 3,338,354 | 8/1967 | Jeffries | 188/71.8 |
| 3,857,468 | 12/1974 | Iritono et al. | 188/196 P |

FOREIGN PATENT DOCUMENTS 218531 7/1956 Australia .................. 188/72.4

Primary Examiner—Edward R. Kazenske
Attorney, Agent, or Firm—Browdy and Neimark

[57] ABSTRACT

An automatic clearance adjusting mechanism is provided for brake in which a piston fitted in an actuator for urging a friction pad onto a rotor member. The piston is retained at a predetermined position in the actuator by a frictional force, and is allowed to axially move a predetermined distance from the retained position against an elastic force. The mechanism includes friction giving ring such as an elastic seal ring for restoring the piston to its original position, by taking advantage of the pressure within the actuator, when the same has been forcibly displaced from the predetermined position due to the elasticity deflection of brake component parts in the event of an unusual pressure rising within the wheel cylinder beyond a predetermined limit.

1 Claim, 8 Drawing Figures

FIG.1 PRIOR ART
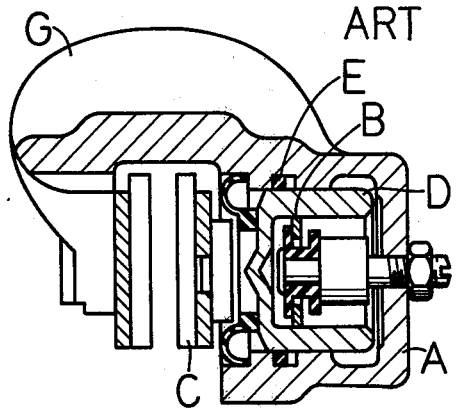
FIG.2 (i) PRIOR ART
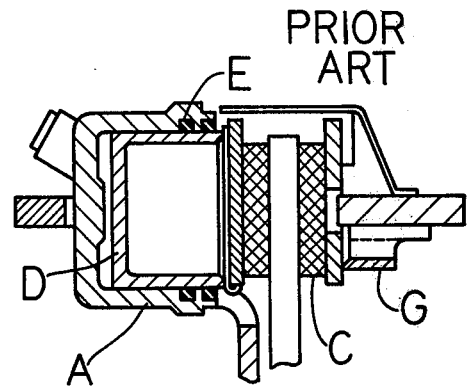
FIG.2 (ii) PRIOR ART
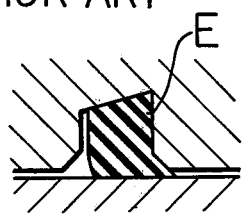
FIG.3 PRIOR ART
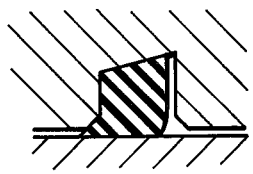
FIG.4 (i)
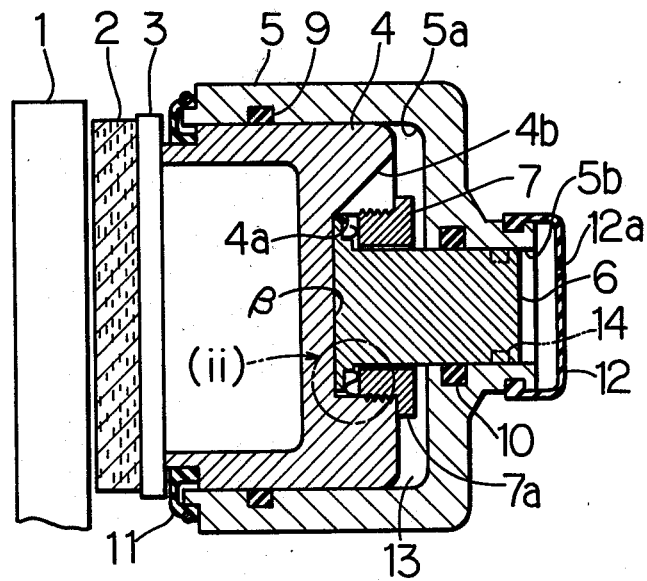
FIG.4 (ii)
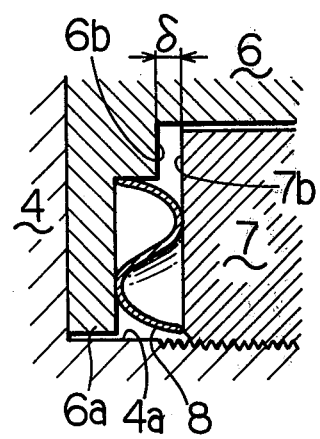

AUTOMATIC CLEARANCE ADJUSTING MECHANISM IN A BRAKE

This is a continuation of application Ser. No. 772,097 filed Feb. 25, 1977, now abandoned.

BACKGROUND OF THE INVENTION

The present invention relates to an automatic clearance adjusting mechanism in a brake including means for preventing a so-called drag or residual friction phenomenon.

A number of mechanisms for automatically adjusting increase of the brake clearance between a rotor member and a friction pad due to wearing of the friction pad of a brake are known. One known type of clearance adjusting mechanism provides that the piston is retained by the actuator by virtue of friction, while being allowed a certain preset amount of axial sliding. In an example of this type an iron ring is mounted in the middle part of the cylinder with a certain fixed amount of axial play. The piston can advance against the friction force with the iron ring in response to the wear of the friction pad. In another example, a seal concurrently functions as a friction ring.

As the abovementioned type of automatic clearance adjusting mechanism can be so simply assembled that it now enjoys a widespread application, it is accompanied by, however, a serious disadvantage that a so-called drag readily takes place in it. That is to say, when an extremely high hydraulic brake pressure is applied a large elasticity deflection takes place in the brake component elements, resulting in occurrence of the relative displacement surpassing the elasticity deflection capacity of the seal between the piston and the cylinder, accompanied by a sliding between the seal and the piston.

As a result of it the seal which is to impart the restoring force to the piston loses the ability of restoring it even after the hydraulic pressure has been released; moreover the same may sometimes work in a manner, on the contrary, to push out the piston. Once this situation has been set the friction pad is urged against the rotor member with a certain pressure (this phenomenon is named the so-called drag phenomenon), which not only brings about power loss but also may develop into more serious dangers such as overheating of the brake, abnormal wearing of the lining, vapor lock, etc.

In order to evade this danger rendering the brake clearance surpassing the elasticity deflection of the brake component elements is enough, which is, however, impracticable in fact because of increasing the amount of oil used with the result of considerable increase of the brake travel. Various propositions on the mechanism of preventing the drag phenomenon have been made. No techniques capable of solving this problem including two contradictory requirements, i.e. reduction of volume of oil used and prevention of drag phenomenon have been known to date.

SUMMARY OF THE INVENTION

The present invention has as its principal object the elimination of the abovementioned disadvantage of the automatic clearance adjusting mechanism in a brake of the type in which the piston is retained at a preset position by frictional force and is allowed to axially move a predetermined distance from the retained position against the elastic force.

Another object of this invention is the provision of an automatic clearance adjusting mechanism wherein the brake clearance will never disappear even when each component of the brake such as a yoke, friction pad, cylinder, etc., has been elastically deflected under a high hydraulic brake pressure.

Still another object of this invention is to solve the problem of drag phenomenon while preserving the simplicity of conventional way of assembling of the mechanism on one hand, with the increase of the brake travel being prevented on the other hand.

A further important object of this invention is to provide an automatic clearance adjusting mechanism in a disk brake applicable in either of rigid calliper type or floating calliper type.

The essential spirit of this invention resides, in an automatic clearance adjusting mechanism in a brake of the type wherein a piston fitted in the brake cylinder for urging the friction member is retained in the cylinder due to the frictional force, in the provision of a preventive means of retention position change of the piston relative to the cylinder caused by an elasticity deflection of brake components in the event of an application of a high hydraulic brake pressure. Owing to this novel mechanism a predetermined brake clearance can be secured without fail, even after a high braking force has been applied; a baffling problem of the drag phenomenon, traditionally deemed as a grave fault of the automatic clearance adjusting mechanism in a brake of this type has been splendidly solved.

BRIEF DESCRIPTION OF THE DRAWING

For the purpose of clarifying other objects, structure, and effects of this invention a few embodiments will be hereinunder described, only by way of example, not for limiting the scope of this invention, referring to the accompanying drawings wherein:

FIG. 1 is a front sectional view of an example showing a conventional device;

FIG. 2(i) is a front sectional view of another example of the conventional type;

FIG. 2(ii) is an enlarged view of an essential part of FIG. 2(i);

FIG. 3 is an explanatory view showing another operation situation of FIG. 2(ii);

FIGS. 4(i), 5 and 6 are respectively a front sectional view showing a first, a second, and a third embodiment of this invention; and FIG. 4(ii) is an enlarged view of a portion marked with (ii) of FIG. 4(i).

BRIEF DESCRIPTION OF THE PREFERRED EMBODIMENTS

Figure 5:
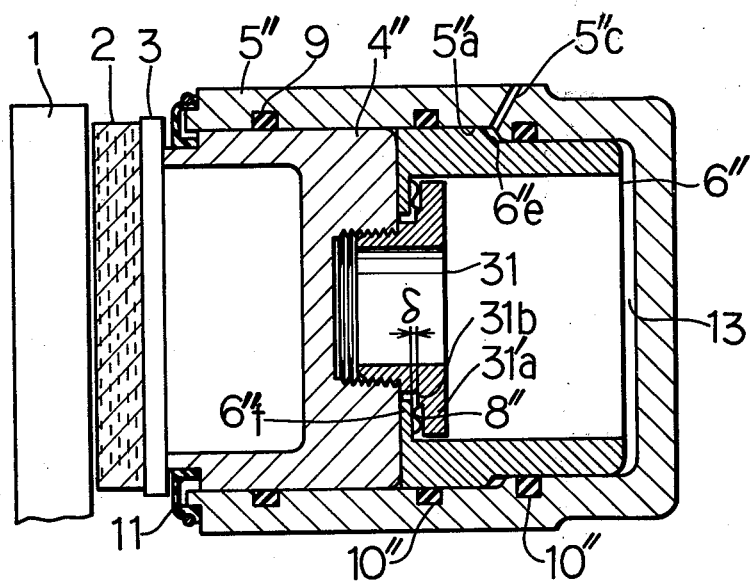

Before describing the preferred embodiments, a few brief remarks concerning the prior art are set out, reference being made to FIG. 1, FIGS. 2(i) and 2(ii) and FIG. 3.

Heretofore devices for automatically adjusting increase of the brake clearance (i.e., a clearance between the rotor disk and the friction pad) due to wearing of the friction pad of a disk brake those mechanisms shown in FIGS. 1, 2(i), 2(ii) and 3, for example, have generally been used. Automatic clearance adjusting mechanisms of this type have, although different as regards details of construction, in common the fact that the piston is retained by the wheel cylinder (hereinafter simply referred to as a cylinder) by virtue of friction while being allowed a certain preset amount of axial sliding. In an example in FIG. 1 an iron ring B is mounted in the middle part of the cylinder A with a certain fixed amount of axial play, and a piston D can advance against the friction force provided by the iron ring B in response to the wear of the friction pad C. In another example shown in FIGS. 2(i), 2(ii) and 3, a seal E concurrently functions as a friction ring; an elasticity deformation or deflection of the seal E usually permits the piston D to duly operate and generates for the same a restoring force as can be seen in FIG. 2(ii); and when the friction pad C is so worn that the stroke of the piston D exceeds the preset amount, a resulting slide between the piston and the seal E will compensate for the amount of wear of the friction pad C.

As the abovementioned automatic clearance adjusting mechanism is so simply assembled that it now enjoys a widespread application, it is accompanied by, however, a serious disadvantage that a so-called drag readily takes place in it. That is to say, when a mighty hydraulic brake pressure is applied a large elasticity deflection takes place in the yoke G and other brake component elements, resulting in occurrence of the relative displacement surpassing the elasticity deflection capacity of the seal E between the piston D and the cylinder A, accompanied by a sliding between the seal E and the piston D.

As a result of it the seal E which is to impart the restoring force to the piston D loses the ability of restoring it even after the hydraulic pressure has been released; moreover the same may sometimes work in a manner, on the contrary, to push out the piston. Once this situation has been set the friction pad C is urged against the rotor disk with a certain pressure (this phenomenon is named the so-called drag phenomenon), which not only brings about power loss but also may develop into more serious dangers such as overheating of the brake, abnormal wearing of the lining, vapor lock, etc.

In order to evade this danger rendering the brake clearance surpassing the elasticity deflection of the caliper G is enough, which is, however, impracticable in fact because of increasing the amount of oil used with the result of considerable increase of the brake travel. Various propositions on the mechanism of preventing the drag phenomenon have been made. No techniques capable of solving this problem including two contradictory requirements, i.e., reduction of volume of oil used and prevention of drag phenomenon have been known to date.

FIGS. 4(i) and 4(ii) illustrate a first embodiment of the present invention, wherein a friction pad 2 in confrontation with a rotor disk 1 with a preset distance is fixed to a pad supporter metal plate 3, which is in abutment with one end of a first piston 4. The first piston 4 is axially slidably fitted in a first cylinder bore 5a of a cylinder 5. On the other end of the first piston 4 opposite from the one which urges the friction pad is formed a recess 4a, where a flange 6a formed on one end of a second piston 6 is captive.

On the second piston 6 is fitted a plug 7 having a throughbore in the center thereof, which plug is meshed with a threaded portion formed on the internal side of the recess 4a. The plug 7 abutted to the end surface of the first piston 4 with its flange 7a, which is by its end surface 7b in confrontation with a stepped portion 6b of the second piston 6 with a distance δ, as shown to a larger scale in FIG. 4(ii), prevents a further separation of the second piston 6 from the first piston 4 beyond the distance δ, i.e., a circumferential groove provided integrally to the first piston 4 in combination with the plug 7, and a circumferential projection (stepped portion 6b) provided integrally to the second piston 6 are mutually engaged, resulting in providing a means for preventing further mutual separation or approach between the first piston 4 and the second piston 6 beyond a predetermined play δ. A ring shaped wave-shaped spring 8 is disposed between the reduced end surface 7b of the plug 7 and the flange 6a of the second piston 6, which constantly biases the second piston 6 toward the first piston 4 being closely contacted therewith. The other end (opposite from the flange 6a side) of the second piston 6 is fitted into a second cylinder bore 5b formed in the central portion of the bottom wall of the cylinder 5.

The fluid tightness between the cylinder 5 and the first and second pistons 4 and 6 is kept by a first seal 9 and a second seal 10 respectively. Ingress of foreign matters into the sliding portions between the cylinder 5 and the first piston 4, and between the cylinder 5 and the second piston 6, is prevented respectively by a dust seal 11 and 12, in the latter being disposed a vent 12a.

An oil chamber 13 is filled with braking oil and communicates with the master cylinder (not shown). On the first piston 4 are formed an appropriate number of notches 4b for effectively venting air entrapped in the recess 4a.

It is prerequisite for the normal function of the automatic clearance adjusting mechanism thus constructed that a certain relationship is established between the following three factors: the frictional force $M_1$ between the cylinder 5 and the first piston 4; the frictional force $M_2$ between the cylinder 5 and the second piston 6; and the set spring force F of the wave-shaped spring 8. Regarding this relationship detailed description will be later made along with the operation of the mechanism.

When the pressure in the oil chamber 13 is raised by the ingress of the pressurized oil from the master cylinder, an urging pressure will be applied to both, the first and second pistons 4 and 6. On the assumption of $M_1 < < F < M_2$, the first piston 4 advances while compressing the wave-shaped spring 8, with the second piston 6 being retained in the cylinder 5 by the frictional force, to urge the friction pad 2 against the rotor disk 1. At this time the end portion 7b of the plug 7 abuts the stepped portion 6b of the second piston 6, and thereafter the first piston 4 and the second piston 6 work as an integral mass, which means that the friction pad 2 is pressed onto the rotor disk 1 with a force equal to the product of the difference between the pressure receiving area $S_1$ of the first piston 4 and that $S_2$ of the second piston 6 multiplied by the hydraulic pressure.

The above description is concerned to a situation when the friction pad 2 is not worn and the disk brake is operated under the normal hydraulic brake pressure; if the friction pad 2 is in such a worn state as not to bear against the rotor disk 1, even when the plug 7 abuts the stepped portion 6b of the second piston 6, the second piston 6, being dragged by the first piston 4, will slide overcoming the frictional force $M_2$ to advance the retention position of the same relative to the cylinder 5 the amount equal to the wear of the friction pad 2.

When the hydraulic brake pressure in the oil chamber 13 is released the first piston 4 is, owing to the spring force of the wave-shaped spring 8, returned toward the second piston 6 which is retained by the frictional force $M_2$ in the cylinder 5.

Between the friction pad 2 and the rotor disk 1, therefore, is given a preset clearance when no braking pressure exists, and the wear amount of the friction pad 2 is to be compensated for by the forcible sliding of the second piston 6 against the frictional force in relation to the cylinder 5. The foregoing is the essential object of the automatic clearance adjusting mechanism and the above mentioned function is not completely different from the conventional ones in its essence, for example, what is shown in FIG. 1. It is true that even the conventional ones are able to satisfactorily function so long as the hydraulic brake pressure is relatively low. Problems appear only when an extremely high hydraulic brake pressure is applied to the cylinder 5, for example, as a result of an urgent braking; in such an event the drag phenomenon of the brake takes place in conventional type automatic clearance adjusting mechanism.

In this embodiment the drag phenomenon can be prevented from taking place, as apparently understood from the following description.

Now assume that a high braking pressure has been applied to the oil chamber 13, the first piston 4 will advance as far as where the friction pad 2 abuts the rotor disk 1; the wave-shaped spring 8 is compressed to widen the clearance between the first piston 4 and the second piston 6 to the greatest possible extent. Besides, the friction pad 2, the cylinder 5, and a yoke (not shown) for supporting the cylinder, etc., are elastically deflected under the high pressure. It results in a sliding to the right (in FIG. 4(i)) of the cylinder 5 in relation to the second piston 6, which means a changing of the retention position of the second piston 6 by the cylinder 5. In the conventional mechanisms the change of the retention position can not be completely restored even after the release of the hydraulic brake pressure, with the result of happening of the drag phenomenon. In this embodiment, on the contrary, the retention position of the second piston 6 by the cylinder 5 is restored to the original place without fail as soon as the hydraulic brake pressure is released, which prevents the appearance of the drag phenomenon.

So long as the pressure within the cylinder 5 is so high as to impart a substantially problematical deflection to the yoke and other parts, the second piston 6 is also being urged to the right (in FIG. 4(i)) by that high pressure; even when the cylinder 5 is moved to the left in relation to the second piston 6 because of the restoration from the elasticity deflection of the yoke and other parts in response to the decreasing of the pressure in the cylinder 5, the second piston 6 does not move to the left together with the cylinder 5 at all. The cylinder 5 and the second piston 6 slide relatively in the reversed direction to that when the pressure in the cylinder is rising. For example, when the pressure within the cylinder 5 has been lowered to around 5 Kg/cm$^2$, in which the elasticity deflection of the yoke and other parts is substantially negligible, the frictional force $M_2$ between the cylinder 5 and the second piston 6 is larger than the hydraulic pressure acting on the second piston 6, enabling the second piston 6 to be retained by the cylinder 5 owing to the frictional force and to be perfectly returned to the original retention position. When the pressure within the cylinder 5 is further lowered the first piston 4 is restored toward the second piston 6 to secure the predetermined clearance between the friction pad 2 and the rotor disk 1.

Required conditions for the abovementioned operation of said mechanism in accordance with this embodiment will be, more in detail, discussed.

Reference characters and numerals used will be listed up, including the aforementioned, as follows:

$M_1$: frictional force between the cylinder 5 and the first piston 4

$M_2$: frictional force between the cylinder 5 and the second piston 6

F: set load of the wave-shaped spring 8

$S_1$: pressure receiving area of the first piston 4

$S_2$: pressure receiving area of the second piston 6

$P_1, P_2, P_3$: pressure within the cylinder.

In the process of pressure P rising within the cylinder 5, regardless of the order in which the first piston 4 and the second piston 6 are operated, the gap or clearance between the two will eventually be widened to the maximum and the first piston 4 will be pressed to the left by the force $P \times (S_1 - S_2)$, so that no special condition is necessary between $M_1$, $M_2$ and F except only the following relation:

$$S_1 > S_2 \quad (1)$$

and $$M_1 + M_2 < P_2(S_1 - S_2) \quad (2)$$

Because, if (1) formula is not satisfied the friction pad 2 is not urged onto the rotor disk 1; and if (2) formula is not satisfied the brake clearance is no longer adjusted, in the event of the friction pad 2 being in a worn state, even when the hydraulic pressure within the cylinder has reached a predetermined value $P_2$. From a view point of the brake power efficiency it is preferable that $S_2$ is as smaller as possible than $S_1$.

Now another case, in which after a normal hydraulic brake pressure has been applied then the pressure in the cylinder is lowered, will be discussed. When the hydraulic pressure in the cylinder has been lowered to $P_1$, the following two formulae must be satisfied for the first piston 4 to be restored by the spring force F of the wave-shaped spring 8 while the second piston 6 is retained in the cylinder 5.

$$M_1 < F - S_1 \times P_1 \quad (3)$$

$$M_2 > F - S_2 \times P_1 \quad (4)$$

Still another case, in which a high hydraulic brake pressure is applied, will be considered, where it is required that the second piston 6 is not retained until the hydraulic pressure in the cylinder 5 has been reached a predetermined value $P_3$, that is:

$$M_2 < S_2 \times P_3 - F \quad (5)$$

is necessary.

Theoretically speaking, when (1) to (5) are all satisfied the mechanism in accordance with the embodiment of this invention will function as expected; that is the frictional force $M_1$ between the first piston 4 and the cylinder 5 is required to be smaller than the spring force F of the wave-shaped spring 8 by a predetermined amount and the frictional force $M_2$ between the second piston 6 and the cylinder 5 is preferred to be greater than the spring force F of the waveshaped spring 8. As to the magnitude of $M_2$, there exists a predetermined maximum; it is not a case of the magnitude being better simply by being larger.

The first embodiment discussed in detail above has a great advantage of being simple and compact in structure; some other embodiments are, however, possible in addition, some of which will be illustrated hereinunder.

In the description the same parts as in the first embodiment same characters, marks, and numerals are attached for omitting the explanation; parts similar in function notwithstanding the different shapes "dash" marks are added to the same signs for explaining only what are different.

Figure 6:
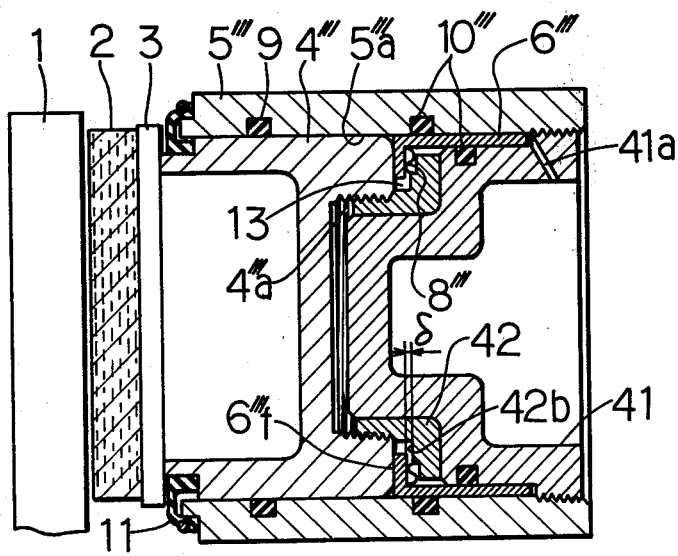

A third embodiment is represented in FIG. 6. It is different from the abovementioned two embodiments in that an annular surface $6''e$ sandwiched by a couple of second seals $10''$, $10''$ is designed to be a surface open to the atmosphere, which determines the pressure receiving area of the second piston $6''$.

The second piston $6''$ is substantially of cylindrical shape and provided with a stepped portion $6''e$ on the outer periphery thereof; this annular surface is via a vent $5''c$ open to the atmosphere. A wave-shaped spring $8''$ is disposed between a flange $6''f$ of the second piston $6''$ and a flange $31a$ of the plug 31. The plug 31 is threadedly meshed with the first piston $4''$. The brake clearance is to be determined by the distance or clearance $\delta$ between the flange $6''f$ of the second piston $6''$ and the stepped portion $31b$ of the plug 31.

This embodiment has an advantage of superiority in venting air because it contains no blocked space in the oil chamber 13; this embodiment is also characterized in that either of the central space of the first piston $4''$ and the second piston $6''$ is hollow and is thereby capable of incorporation any other means thereinto.

A third embodiment is illustrated in FIG. 6; in contrast to the abovementioned two embodiments wherein the cylinder is of cup-shape, the cylinder in this embodiment is cylindrical in shape. On one end of the cylindrical cylinder $5'''$ is threadedly meshed a plug 41; into an annular space formed between the cylinder $5'''$ and the plug 41 is fitted a cylindrical second piston $6'''$. The fluid tightness between the cylinder $5'''$, the second piston $6'''$, and the plug or bottom cup 41 is preserved with a pair of second seals $10'''$, $10'''$; an annular end surface of the second piston $6'''$ is open to the atmosphere via a vent $41a$. A wave-shaped spring $8'''$ is disposed between a plug 42 threadedly meshed with the first piston $4'''$ and a flange $6'''f$ of the second piston $6'''$. The brake clearance is determined by the distance or clearance between the stepped portion $42b$ of the plug 42 and the flange $6'''f$ of the second piston $6'''$. An appropriate number of communication bores to vent air (not shown) are formed between the oil chamber 13 and a recess $4'''a$ of the first piston $4'''$.

This embodiment is characterized in that the total length thereof can be shorter than that of the second embodiment while maintaining the advantage just like in the second embodiment, that the central spaces of the first piston $4'''$ and the plug 41 can be utilized for mounting some other means.

In addition, the cylindrical shape of the cylinder $5'''$ renders the processing of the inside far easier in comparison to the cup-shaped cylinders. Still another merit resides in that the removability of the plug 41 renders checking and fixing of inside possible without dismantling the yoke.

Summing up the abovementioned three embodiments still something important must be added hereinunder:

a wave-shaped spring used in all embodiments as a means for biasing the first and second pistons toward each other may be replaced by other elastic materials, for example, rubber or soft resin, in other words biasing means here is not limited to the wave-shaped spring;

the present invention provides much more improved effects, in comparison to various known anti-drag mechanisms, in the reliability of prevention of drag phenomenon and the reduction of oil consumption while maintaining the same level of the assembling cost and the number of parts required for its assembling as the level that used to be;

prevention of drag phenomenon of the brake results in a decrease of resistance in the vehicle running, and in turn, a decrease of fuel cost, and it brings about a long life of the friction pad and furthermore it eliminates various disadvantages caused by the overheating of the brake; and the last but not the least important merit of this invention is that a drag phenomenon or an increase of oil consumption caused by the inferiority of assembling precision in the initial stage of usage and by the biased wear of the friction pad can be prevented.

The present invention can be applied to drum brakes with some modification, too, enjoying these merits mentioned above.

It will be obvious to those skilled in the art that various changes may be made without departing from the scope of the invention and the invention is not to be considered limited to what is shown in the drawing and described in the specification.

What is claimed is:

1. An automatic clearance adjusting mechanism for a brake which is provided with a first piston fitted in a bore of a cylinder, a fluid chamber being defined by said first piston, said bore and a closed end of said cylinder, said first piston being slidable in said cylinder upon the application of fluid pressure into said chamber for urging a friction member onto a rotor member, comprising:

a second piston slidably fitted in said bore of said cylinder between said first piston and said closed end of said cylinder;

restricting means for limiting mutual separation beyond a predetermined distance between said first piston and said second piston;

a spring disposed between said first piston and said second piston for biasing both into abutting engagement with one another; and a frictional force generating means disposed between said cylinder and the outer periphery of said second piston for retaining said second piston with a predetermined frictional force, said mechanism characterized in that said second piston of annular cylindrical form is provided with a stepped portion formed on said outer peripheral surface thereof and the small diametered portion thereof is located remote from said first piston, an integral inwardly directed projection being formed on the inner peripheral surface of said second piston adjacent said first piston, said bore being formed with a stepped portion confronting said stepped portion of said second piston to form an annular chamber therebetween, said annual chamber being open to ambient atmosphere through a passage formed in said cylinder, and said restricting mean being a plug threaded into said first piston and provided with an integral outwardly directed projection, said outwardly direction projection being normally spaced from said inwardly direction projection by a distance equal to said predetermined distance and being engageable with said inwardly directed projection upon sliding movement of said first piston in said cylinder beyond said predetermined distance to slide said second piston is said cylinder relative to said frictional force generating means.

* * * * *